Dec. 16, 1958

C. L. MILLER 2,864,204

TOP STEM MOLD CLEANOUT

Filed Feb. 14, 1957

INVENTOR
CHARLES L. MILLER

BY Michael Hertz,

ATTORNEY

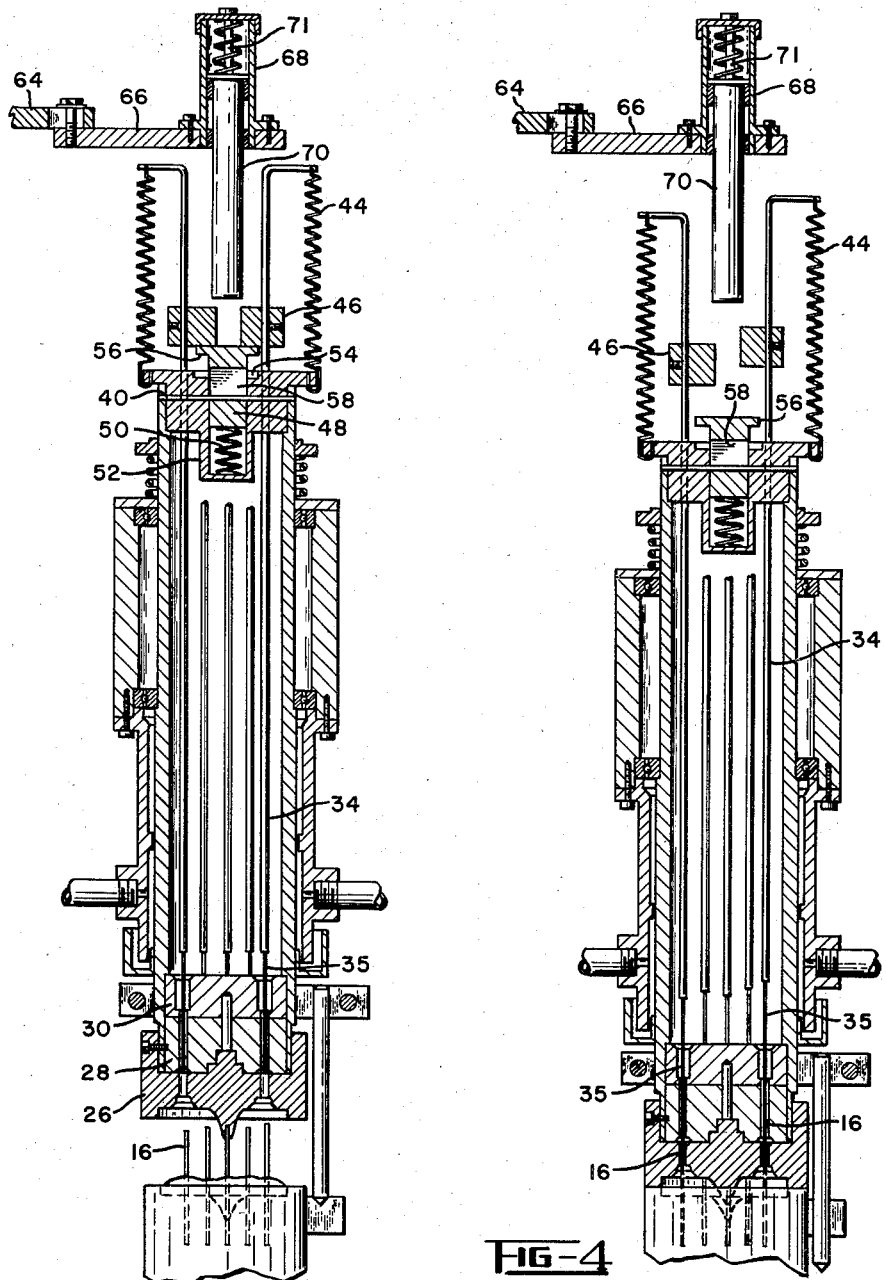

United States Patent Office 2,864,204
Patented Dec. 16, 1958

2,864,204
TOP STEM MOLD CLEANOUT

Charles L. Miller, Lock Haven, Pa., assignor to Sylvania Electric Products Inc., a corporation of Massachusetts Application February 14, 1957, Serial No. 640,134

11 Claims. (Cl. 49—66)

This invention relates to means for maintaining bores of press molds free of extraneous materials.

In one form of press used in the manufacture of stems for electronic tubes it is necessary to insert stem leads into a bottom press mold, surround the stem leads with a collar or collet of glass, fuse the glass, and while the glass is fused bring a top press mold down onto the glass to shape the same. The top mold is provided with bores to receive the tops of the stem leads and rods are provided in the top mold which are spring pressed onto the tops of the stem leads to ensure against their floating up into the molten glass and out of seating position in the bottom mold. On withdrawal of the top press mold, it often occurs that some of the stem leads are left in the bore or some of the glass of the stem solidifies in the bores of the top mold causing destructive effects on subsequent stems and therefore necessitating stoppage of the machine for manual clearing out of the bores.

It is an object of the invention to provide for means for automatically stripping the bores of any extraneous material.

It is a further object of the invention to effect such stripping operation after every molding operation of the press.

It is a still further object to provide a bore stripping device of such a character that it may be applied to existing mechanism with very few changes therein.

These and other objects will become apparent upon consideration of the following description when taken in conjunction with the accompanying drawing in which:

Fig. 3 is a similar view but showing the upper press partially lowered and

Fig. 4 is also a similar view but showing the upper press in completely lowered position.

Figures 1, 2:
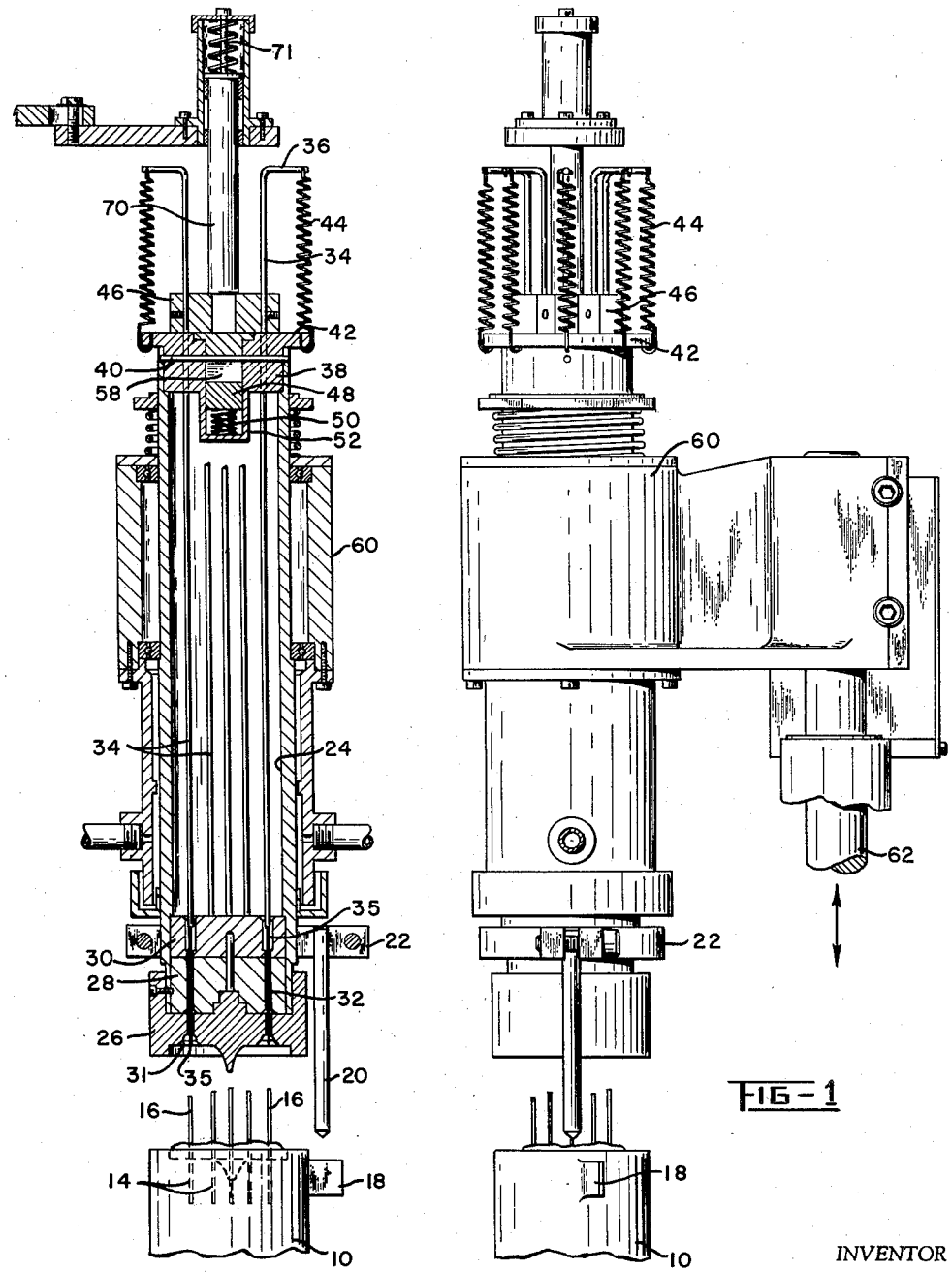
Fig. 1 shows a side view of a portion of the press with the invention embodied therein.
Fig. 2 is a view of the same press portion when the upper press mold is completely raised up above the lower mold, the upper press being shown in section and some of the rods being broken away at the top.

Referring to Figs. 1 and 2, it will be seen that the press comprises a lower mold 10 in which is a recess 12, shown in dotted outline, and provided with bores 14 to seat the leads 16 of a stem. These leads 16 may be of variable lengths and extend to different heights above the bottom mold. For the purposes of illustration the left hand lead 16 is shown shorter than the others. In the conventional machine of the type upon which the improvement of the invention has been made, the lower mold is rotated about its vertical axis so that opposed glass melting flames directed radially of the axis of the lower mold and at the glass collet level may reach every part of the glass and uniformly heat the same. The lower mold is provided with a radial projection 18 for engagement with a finger 20 held in a collar 22 secured to a rotatable sleeve 24 forming part of the upper press. The sleeve at its lower end has keyed to it the upper mold block 26, the same being suitably recessed and contoured to give desired configuration to the top of the glass of the stem when the molds are engaged.

In order to allow space for the leads 16, the mold block 26 and super adjacent filler blocks 28 and 30 are provided with registering bores 32 into which the leads 16 extend as the molds approach each other. To provide for better seal of the glass to the leads and to facilitate entry of the leads into the bores, the lower ends of the bores are usually flared as indicated at 31. The finger 20 is long enough to engage the lug 18 prior to the leads 16 entering the bores 32 and the relative position of lug 18 and the finger 20 is such that registration of the bores 14 in the lower mold and the bores 32 in the upper mold is effected.

In order to ensure the leads 16 being seated in their bores 14, the upper press is provided with a number of longitudinally extending spring pressed rods 34, one for each bore 32, the lower ends 35 of the rods being reduced in size to snugly pass through the bore portions in block 28 and mold 26 and to engage the upper ends of leads 16. Each of the rods 34 at its upper end has a right angular extension 36 and each rod passes through and extends above a cap 38 which cap is held to the sleeve by any suitable means and including a cross pin 40. Formed as an integral part of the cap 38 is a circular flange 42 and stretched between each of the angular extensions 36 and the flange is a fairly light coil spring 44. Adjustably secured to each of the rods, above in the form of a cap, is a stop block 46. The function of the springs 44 is to force the rods 34 downwardly until the stop blocks abut the top planar surface of a plunger 48, see Figs. 2 and 3, this plunger being spring pressed upwardly by a comparatively stiff spring 50 reacting between the bottom of the plunger and the bottom of a pocket 52 extending downwardly from and integral with the cap. The upper face of the cap, see Fig. 3, is provided with a recess 54 for seating the flanged upper end 56 of the plunger with the upper faces of the plunger and cap in coplanar relationship in one position of the upper press. The plunger is provided with an elongated slot 58 whose walls straddle the pin 40 whereby the pin serves to limit the upward movement of the plunger and consequent elevation of the rods with respect to upper mold 26. In the position illustrated in Fig. 3, the upper press is in an intermediate position with respect to its up and down movement and the spring 50 has operated on the plunger 48 to lift the blocks 46 and the rods 34, against the action of all of the springs 44, in order to bring the lower ends of the rods up above the bottom of the recess and bores in block 26 to allow free entrance of the pins 16 into the bores in the blocks on downward motion of the upper press.

As the upper press moves downward from the position of Fig. 3 to the position of Fig. 4, the upper ends of leads 16 engage the lower ends of the rods and force them upwardly against the individual resistances of springs 44. The upper press, see Figs. 1 and 2, is vertically reciprocated by suitable mechanism including a bearing collar 60 fixed to the upper end of a vertically translatable shaft 62 which is suitably driven by the machine.

Adjustably secured to a fixed part 64 of the machine frame is a plate 66 supporting a spring housing 68 within which is located an abutment 70 whose lower end is large enough to engage the upper surfaces of the blocks 46 when the upper press is being raised to its full upper position. A spring 71 within the housing resists motion of the rod until, see Fig. 2, the plunger 48 is fully seated in the cap recess after which the spring 71 may yield, should there by any upward overtravel of the upper press.

As the upper press moves from the position of Fig. 4 to the position of Fig. 3, the springs 44 cause the rods 34 to move down through the bores in the block 26 to maintain engagement of the lower ends of the rods with the leads 16. By the time the upper press has reached the position of Fig. 3 all of the rods have separated from the leads 16 and the blocks 46 are bearing against the top of plunger 48. On continued upward motion of the upper press toward the Fig. 2 position, the abutment 70 will engage the upper surfaces of blocks 46 and force these down against the action of spring pressed plunger 48. Since the rods 34 are fast with the blocks 46, the rods also will be moved downward relative to the mold 26 from the position shown in Fig. 3 to the position shown in Fig. 2. The lower end 35 of the rods will then completely traverse the bores in the mold 26 to positively force out any glass or other blocking material in the bores. On initial downward movement of the upper press, the spring 50 will force the plunger 48 and blocks 46 upwardly, the blocks thereby withdrawing the lower ends of the rods from the bores in mold 26, see Fig. 3, allowing free admission of the leads into the bores on further downward motion of the upper press.

Having thus described the invention what is claimed as new is:

1. A press including a movable support, a mold on said support having a molding surface, a bore traversing the mold terminating in said surface, a bore clean out rod having an end portion movable in said bore and to a position at least flush with said molding surface, a fixed support, resilient means reacting between the movable support and rod for moving the rod part way toward the molding surface and additional means on said fixed support reacting with said rod on movement of the movable support toward the fixed support to further move the end portion of the rod at least to the molding surface.

2. A press comprising a first mold, a second mold movable toward and from the first mold, said second mold including a molding surface and a bore extending through the mold and to the molding surface, a rod having an end slidable in said bore, means operative on separating movement of the molds to first drive the rod end to a position short of where the end is at the molding surface and additional means operative when the molds are still further separated to drive the end of the rod to a position at least flush with the molding surface.

3. A press including a movable sleeve, a mold carried at one end of said sleeve and having a molding surface and a bore extending through the mold to the molding surface, a rod reciprocatable in said sleeve and having an end portion slidable in said bore, a plunger at the opposite end of the sleeve, means urging said plunger to move in a direction away from the molding surface, a stop fixed to said rod, resilient means urging said rod so that the stop will engage the plunger and means to move the plunger in opposition to the resilient means.

4. A press including a movable sleeve, a mold carried at one end of said sleeve and having a molding surface and a bore extending through the mold to the molding surface, a rod reciprocatable in said sleeve and having an end portion slidable in said bore, a plunger at the opposite end of the sleeve, means urging said plunger to move in a direction away from the molding surface, a stop fixed to said rod, resilient means urging said rod so that the stop will engage the plunger and means engaging the stop to move the plunger in opposition to the resilient means.

5. A press comprising a first mold and a second mold movable toward and from the first mold, said second mold including a molding surface and a bore extending through the mold and to the molding surface, a rod having an end slidable in said bore, resilient means urging said rod to move the end through the bore, yielding means arresting said rod before the end of said rod has reached the molding surface, and means operative on full separating movement of the molds overcoming said yielding means to enable the resilient means to bring the end of the rod at least to the molding surface.

6. A press including a sleeve with means to reciprocate the same longitudinally of its axis, a mold at one end of the sleeve and a cap at the other end thereof, said mold having a molding surface and passages extending therethrough from the molding surface, a compression spring seated by said cap, a member movable with respect to said cap urged away from said cap by said spring and restrained against excessive motion with respect to said cap, rods movable in said sleeve and having ends riding in the passages in the mold, blocks at the opposite ends of the rods, a tension spring interposed between each rod and a part carried by the sleeve to urge the blocks toward the member, and an abutment operative in one direction of movement of the sleeve to force the member to move with respect to the cap against the action of the compression spring to thereby enable the first ends of the rods to be moved by the tension springs to, at least, the molding surface of the mold.

7. A press comprising a vertically reciprocatable sleeve and a press mold secured to the bottom of the sleeve, means for reciprocating the sleeve, bores through said mold extending from a molding surface thereof and into the sleeve, rods in said sleeve aligned with said bores, springs reacting between said sleeve and rods to urge the lower ends of the rods toward the molding surface, a stop on each rod, yielding means on the sleeve engageable by the stops on said rods to arrest the rods before their lower ends are projected beyond the molding surface, an abutment on the press above the sleeve, said abutment engaging the stops on the rods and overcoming the yielding means on the sleeve when the sleeve is raised, thereby projecting the lower ends of the rods at least to the molding surface to clear the bores in the press mold of any debris.

8. A press including a sleeve with means to reciprocate the same longitudinally of its axis, a mold at one end of the sleeve and a cap at the other end thereof, said mold having a molding surface and passages extending therethrough from the molding surface, a compression spring seated by said cap, a member movable with respect to said cap urged away from said cap by said spring and restrained against excessive displacement with respect to said cap, rods movable in said sleeve and having ends riding in the passages in the mold, blocks at the opposite ends of the rods, a tension spring interposed between each rod and the cap to urge the blocks toward the member, and an abutment operative in one direction of movement of the sleeve to force the member to move with respect to the cap, against the action of the compression spring, to thereby enable the first ends of the rods to be moved by the tension springs to, at least, the molding surface of the mold.

9. A press comprising a sleeve and means for reciprocating the same, a mold having a molding surface, at one end of the sleeve and a cap at the other, said mold having passages therethrough terminating in the molding surface, a spring seated in the cap, a plunger engaged by said spring to move the same in a direction away from the mold, means on the sleeve to limit the plunger movement, rods slidable through the cap and having ends slidable in the passageways, stops on said rods engageable with said plunger, springs interposed between said rods and said cap to urge the stops toward engagement with the plunger, and an abutment on the press engageable with a part fixed with respect to the rods, on movement of the sleeve toward said abutment, to overcome the action of the cap seated spring and project the ends of the rods through the passageways to at least the molding surface of the mold.

10. A press comprising a sleeve and means for reciprocating the same, a mold having a molding surface, at one end of the sleeve and a cap at the other, said mold having passages therethrough terminating in the molding surface, a spring seated in the cap, a plunger engaged by said spring to move the same in a direction away from the mold, means on the sleeve to limit the plunger movement, rods slidable through the cap and having ends slidable in the passageways, stops on said rods engageable with said plunger, springs interposed between said rods and said cap to urge the stops toward engagement with the plunger, and an abutment on the press engageable with the stops on said rods to cause the stops to move the plunger against the action of the cap-seated spring and project the ends of the rods through the passageways to at least the molding surface of the mold.

11. A press including a sleeve with means for reciprocating the same, a mold, having a molding surface, at one end of the sleeve and a cap at the other end thereof, alined passageways through said mold and cap, rods slidable in said passageways, said cap having a depending housing, a spring seated in said housing, a plunger mounted on said spring, a transverse passageway elongated in the direction of movement of the plunger through said plunger, a pin fixed to the cap traversing said transverse passageway to limit plunger displacement, stops on the rods, springs between the rods and cap to urge the stops on the rods toward and into engagement with the plunger, and an abutment on the press, operative on displacement of the sleeve theretoward, to engage the stops and move them against the force exerted by the housing seated spring to cause the rods to move through the mold to at least the molding surface thereof.

References Cited in the file of this patent

UNITED STATES PATENTS

| | | |
|---|---|---|
| 2,195,483 | Franke | Apr. 2, 1940 |
| 2,321,224 | Madden et al. | June 8, 1943 |
| 2,504,842 | Juvinall et al. | Apr. 18, 1950 |
| 2,600,052 | Gartner et al. | June 10, 1952 |
| 2,618,904 | Gartner | Nov. 25, 1952 |
| 2,671,291 | Daley | Mar. 9, 1954 |